I. N. PYLE.
Cultivator.
No. 26,121.  Patented Nov. 15, 1859.
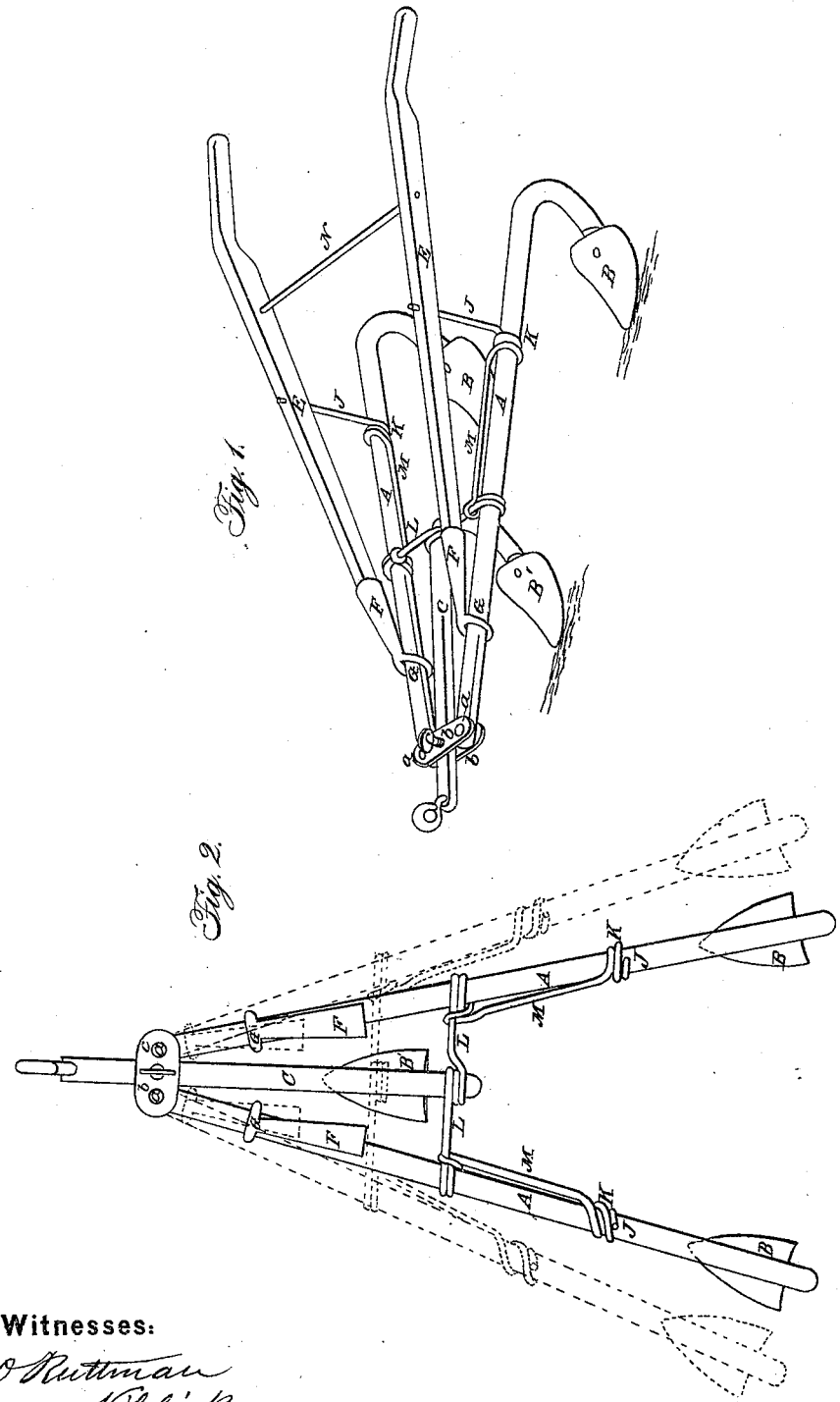

UNITED STATES PATENT OFFICE.

ISAAC N. PYLE, OF DECATUR, INDIANA.

IMPROVEMENT IN CULTIVATORS.

Specification forming part of Letters Patent No. 26,121, dated November 15, 1859.

*To all whom it may concern:*

Be it known that I, ISAAC N. PYLE, of Decatur, in the county of Adams and State of Indiana, have invented a new, useful, and Improved Cultivator; and I do hereby declare that the following is a full, clear, and exact description thereof, reference being had to the accompanying drawings, and to the letters of reference marked thereon, in which—

Figure 1 represents a perspective view of the cultivator, showing the construction of the same. Fig. 2 is a plan view with the handles of the cultivator removed. The parts are shown by this figure in two positions.

My invention consists in an improved mode of adjusting the wings of the cultivator and also the central beam, so that the wings may be spread out or contracted by a simple arrangement, hereinafter described.

To enable others skilled in the art to make and use my invention, I will proceed to describe its construction and operation.

A A represent the two wings, which are made of round iron rods and pivoted by strong pins $a\,a$ between two lateral plates, $b\,b$. The rear portions of these rods A A are curved, as represented by Fig. 1, and the ends flattened, and to these ends are bolted the shovels B B, the proper inclination being given to the shovels by the curvature of the rods.

C is a central rod or beam, which has its rear end curved and provided with a shovel, B', making a triple-shovel cultivator. This center beam, C, is capable of a longitudinal adjustment by loosening the thumb-screw $c$, and to this beam is attached the team for drawing the machine through the ground.

E E are the handles, which are secured to sockets F F, and said sockets are provided with loops or rings G G on their ends, which encompass the wings A A and move back and forth upon them in adjusting the cultivator. These handles are supported by vertical standards J J, which may be made of any suitable stiff metal. These rods forming the standards are wound around the wings, as clearly shown by Fig. 1, forming rings K, which are connected to the cross-brace L by rods M M. The cross-brace L is attached to the rods forming the wings A A, and also to the center beam, C, in the same manner as the standards are connected to the wings—viz., by rings which can be moved upon the rods when it is desired to adjust the parts.

N is a lateral brace-rod for the handles E E.

With this arrangement the adjusting of the wings can be effected by simply moving the handles longitudinally, the brace L, rods M M, and standards all being moved simultaneously.

What I claim as my invention, and desire to secure by Letters Patent, is—

The arrangement and combination of the curved pivoted wing-rods A A, curved adjustable central rod, C, looped sockets F, vertical movable standards J, rods M, braces L, and handles E, as and for the purpose herein shown and described.

I. N. PYLE.

Witnesses:
  JESSE NIBLICK,
  I. D. NUTTMAN.